(12) United States Patent
Shuai et al.

(10) Patent No.: US 9,384,253 B1
(45) Date of Patent: Jul. 5, 2016

(54) SYSTEM AND METHOD FOR MULTIPLE-LAYER DATA REPLICATION IN A LINUX ARCHITECTURE

(71) Applicant: CA, Inc., Islandia, NY (US)

(72) Inventors: Ran Shuai, Beijing (CN); Xiaopin Wang, Beijing (CN); Shisheng Liu, Beijing (CN)

(73) Assignee: CA, Inc., New York, NY (US)

( * ) Notice: Subject to any disclaimer, the term of this patent is extended or adjusted under 35 U.S.C. 154(b) by 389 days.

(21) Appl. No.: 13/801,063

(22) Filed: Mar. 13, 2013

(51) Int. Cl.
*G06F 17/30* (2006.01)

(52) U.S. Cl.
CPC .............................. *G06F 17/30581* (2013.01)

(58) Field of Classification Search
None
See application file for complete search history.

(56) References Cited

U.S. PATENT DOCUMENTS

| | | | | |
|---|---|---|---|---|
| 2006/0047713 | A1* | 3/2006 | Gornshtein et al. | 707/202 |
| 2010/0228913 | A1* | 9/2010 | Czezatke et al. | 711/112 |
| 2012/0030313 | A1* | 2/2012 | McGowan et al. | 709/219 |
| 2013/0159646 | A1* | 6/2013 | Atzmon et al. | 711/162 |

OTHER PUBLICATIONS

"Notes on the Generic Block Layer Rewrite in Linux 2.5" printed from www.kernel.org/doc/Documentation/block/biodoc.txt, notes written on Jan. 15, 2002, 20 pages.
Wong, Peter Wai Yee, et al., "Improving Linux Block I/O for Enterprise Workloads", *Proceedings of the Ottawa Linux Symposium*, Jun. 26-29, 2002, Ottawa, Ontario, Canada, 19 pages.
Axboe, Jens, "Linux Block IO—Present and Future", *Proceedings of the Linux Symposium*, vol. One, Jul. 21-24, 2004, Ottawa, Ontario, Canada, 14 pages.
"Kernel 2.6 Device Drivers, Block I/O Structure", printed from http://docs.blackfin.uclinux.org/, last updated Sep. 30, 2010, 4 pages.
"Chapter 13. The Block I/O Layer", printed from http://users.atw.hu/linuxkernel2/ch13.html, Feb. 10, 2012, 16 pages.

* cited by examiner

*Primary Examiner* — Belix M Ortiz Ditren
(74) *Attorney, Agent, or Firm* — Pillsbury Winthrop Shaw Pittman LLP

(57) ABSTRACT

The system and method described herein may support multiple-layer data replication using a block input/output ("BIO") structure that an operating system kernel employs to provide an intermediate mechanism between file systems and block devices. For example, the system and method described herein may capture events that occur when the kernel uses the BIO structure to encapsulate input/output requests that will change data on a master block device. As such, a replication mechanism may send the changes encapsulated within the BIO structure to a replay mechanism, which may then replicate the changes on a standby block device to ensure that the master block device and the standby block device have an identical state. Alternatively, a filter may be used to only replicate changes to certain partitions or file system objects on the master block device.

30 Claims, 5 Drawing Sheets

100

SYSTEM AND METHOD FOR MULTIPLE-LAYER DATA REPLICATION IN A LINUX ARCHITECTURE

BACKGROUND

The Linux kernel has a structure, alternatively called the block input/output ("I/O") or simply BIO structure, to manage different data delivery mechanisms that certain block devices or block driver I/O systems require. In particular, block devices generally include hard disks, flash memory, and other hardware devices that randomly access data in blocks or chunks having a fixed size (e.g., hard drives have the capability to read the contents in a first arbitrary block and then read the contents in a different block that need not be consecutive or otherwise contiguous with the first block).

BRIEF SUMMARY

According to an aspect, a system and method described herein may generally provide various techniques to perform multiple-layer data replication. In particular, the system and method described herein may utilize a block input/output ("BIO") structure in the input/output ("I/O") subsystem associated with the an operating system kernel to perform data replication associated with I/O requests that the kernel may process via a block device layer in the I/O subsystem associated therewith. As such, the BIO structure may provide an intermediate or middle layer between a file system and a block device, which the system and method described herein may use to provide multiple-layer data replication at a whole block device level, a partition level, and a file system level (e.g., at the file level, folder level, directory level, etc.). For example, in one implementation, the system and method described herein may include various mechanisms that can capture events that relate to a kernel converting BIO structures into block device I/O requests, wherein the BIO structures may encapsulate information relating to one or more changes that the block device I/O requests will apply to data stored on a master block device. Accordingly, in one implementation, the one or more changes may then be replicated on a standby (or replica) block device to ensure that the master block device and the standby block device have a synchronized or otherwise identical state in a manner that may exhibit various advantages over techniques traditionally used to perform data replication in Linux architectures.

According to an aspect, the system and method described herein may include a monitoring mechanism hosted on a master system that further hosts the master block device to be replicated, wherein the monitoring mechanism may intercept events that occur in response to the kernel using a BIO structure to create a request structure that will apply one or more changes to the master block device. In one implementation, the monitoring mechanism may then analyze the BIO structure to identify information encapsulated therein that describes the changes that the created request structure will apply to the master block device. For example, in one implementation, the monitoring mechanism may include an independent data capture module loaded into the kernel, wherein the data capture module may be configured to perform various operations in response to being loaded on the master system, wherein the various operations may include initially locating a "gendisk" structure that the kernel uses to represent the master block device or certain partitions associated with the master block device. The gendisk structure may include a pointer to a request queue structure having a pointer to a standard operating system function that the kernel calls to create a particular request structure from a particular BIO structure and place the request structure on the request queue. Accordingly, whenever the data capture module detects one or more changes to the master block device that need to be replicated to the standby block device, the data capture module may locate the gendisk structure corresponding to the master block device through standard operating system interfaces. In response to locating the gendisk structure corresponding to the master block device, the data capture module may then read the gendisk structure to obtain a "queue" pointer contained therein, which may identify the request queue structure associated with the gendisk structure corresponding to the master block device.

According to an aspect, the system and method described herein may further use a predefined function to override the standard operating system function that the kernel uses to create the request structure and place the request structure on the request queue and thereby create an override request queue structure that substitutes the standard function with the predefined function. In one implementation, the predefined function used to create the override request queue may have one or more parameters to specify a BIO structure, which may be used to record all data changes that the specified BIO structure encapsulates to describe one or more write requests associated with the master block device. As such, the recorded data changes may then be replicated on the standby block device. Furthermore, in one implementation, the predefined function used to create the override request queue may use the same parameters to call the standard operating system function based on the original request queue structure (i.e., prior to the override). For example, the pointer to the standard function may be saved to a global variable associated with the data capture module, whereby the standard function may be called to apply the changes that were recorded and replicated on the standby block device on the master block device. Accordingly, the data capture module may use these techniques to achieve multiple-layer data replication at various levels, including at a whole block device level, a partition level, and a file system level (e.g., at the file level, folder level, directory level, etc.).

According to an aspect, replication at the whole block device level may be considered the most straightforward because the data capture module generally captures the BIO structures that relate to all I/O requests associated with the master block device. As such, to replicate any changes to the master block device, the data capture module may simply send all captured changes to the master block device to the replica system, which may invoke a replay engine to recreate or otherwise replay the I/O requests associated with the changes on the standby block device in order to replicate the changes.

According to an aspect, replication at the partition level may relate to scenarios in which several different partitions occupy different data spaces or data ranges within the master block device, whereby the system and method described herein may only replicate changes associated with selected partitions on the master block device rather than the entire master block device (e.g., to minimize the time, data quantity, or other aspects associated with the replication operations). As such, to achieve replication at the partition level, the data capture module may have a replication filter that can record a sector address range that a particular partition to be replicated has on the master block device and filter out any BIO structures that include changes to data located outside the particular partition without replicating the changes encapsulated in the filtered out BIO structures. For example, every partition in the kernel may have a representative "partition" structure, wherein every instance associated with the partition structure may record a starting sector address and a starting cylinder. Consequently, in response to the data capture module capturing a BIO structure that encapsulates certain changes to the master block device, the replication filter may compare the previously recorded sector address range with the sector addresses associated with the changes encapsulated in the captured BIO structure to determine whether or not the captured BIO structure belongs to the partition subject to replication.

According to an aspect, to determine whether or not the captured BIO structure belongs to the partition subject to replication, the replication filter may determine whether the sector addresses associated with the changes encapsulated in the captured BIO structure apply to sectors outside the previously recorded sector address range, in which case the captured BIO structure need not be replicated and the changes may be discarded. In contrast, if the sector addresses associated with the changes encapsulated in the captured BIO structure apply to sectors between the starting and ending sector addresses associated with the partition subject to replication, the data capture module may send the encapsulated changes to the replica system, which may invoke the replay engine to replicate the changes on the standby block device. Furthermore, the replay engine may perform an address conversion prior to replicating the changes on the standby block device to accommodate the particular configuration that the partition has on the standby block device. For example, the partition on the master block device replicated on the standby block device may have different a sector offset than the replica partition on the standby block device. Accordingly, the replay engine may use a sector converter to adjust the starting sector and cylinder offset associated with the changes to be replicated and thereby accommodate the particular configuration that the replica partition has on the standby block device.

According to an aspect, replication at the file system level may be used in certain conditions where replication at the whole block device and partition levels may be unsuitable because the whole master block device and individual partitions associated therewith may contain more data that needs to be replicated or replication may only be desired to protect certain critical files, folders, directories, or other file system objects associated with the master block device. As such, to achieve replication at the file system level, the replication filter described above may perform the comparison to filter out the changes to be replicated based on inodes rather than sectors. More particularly, a certain BIO structure may point to a memory page that initially stores changes to data on the master block device and the kernel may represent the memory page pointed to in the BIO structures with a "page" structure, which points to a "mapping" structure that identifies an address space associated with the memory page that stores the data changes. Further, the mapping structure may have a pointer to particular inodes associated with certain files, folders, or other file system objects associated with the data changes, whereby the replication filter may use the above-mentioned structures and associated pointers to trace every file, folder, directory, or other file system object associated with captured BIO structures and determine whether or not to replicate changes associated therewith. For example, the replication filter may use the above-mentioned structures and associated pointers to determine the address space associated with the memory page that stores the data changes and the particular inodes associated with the files, folders, directories, or other file system objects associated with the data changes. Consequently, the replication filter may compare the inodes associated with the data changes to the inodes associated with certain files, directories, or other file system objects subject to replication to determine whether or not to replicate the changes.

According to an aspect, to minimize the time associated with the comparison used to replicate at the file system level, the data capture module may initially traverse particular folders or directories to be replicated in an iterative manner to build a list that identifies the inode numbers associated with the particular folders or directories subject to replication and every file or other file system object located thereunder. As such, in response to subsequently capturing a BIO structure that encapsulates changes to the master block device, the replication filter may obtain inode numbers associated with the inodes that relate to the encapsulated changes and search the list against the inode numbers obtained from the captured BIO structure to determine whether or not the inode numbers obtained from the captured BIO structure relate to the particular folders or directories subject to replication. In response to determining that the inode numbers obtained from the captured BIO structure do not directly or indirectly match any inode numbers associated with the particular folders or directories to be replicated, the replication filter may discard the changes, whereas the changes may be replicated on the standby block device if the inode numbers obtained from the captured BIO structure directly or indirectly match any inode numbers associated with the particular folders or directories subject to replication.

According to an aspect, to complete the replication at the file system level, the replay engine may use the sector converter to perform an address conversion prior to replicating the changes on the standby block device and thereby accommodate the particular configuration associated with the standby block device. For example, the sector converter may convert sector addresses that the data associated with the changes have on the master block device to sector addresses that the corresponding data have on the replica block device. In particular, as noted above, the BIO structure may point to the memory page that stores the data changes and a target location on the master block device where the data changes will be applied, whereby to replay the process used to apply the data changes on the master block device, the sector converter may map the sector addresses associated with the master block device to sector addresses associated with the standby block device. For example, certain files may have different sector addresses on the master block device and the standby block device, whereby the sector converter may adjust the sector addresses that the files have on the master block device to the sector addresses that the corresponding replica files have on the standby block device to achieve replication at the file system level.

Other objects and advantages of the invention will be apparent to those skilled in the art based on the following drawings and detailed description.

BRIEF DESCRIPTION OF THE DRAWINGS

FIG. 5A illustrates a system to replicate a master block device associated with a master Linux system on a standby block device associated with a replica Linux system, while

DETAILED DESCRIPTION

In later versions, the Linux kernel was redesigned to adopt a new structure, alternatively called the block input/output ("I/O") or simply BIO structure, to manage different data delivery mechanisms that certain block devices or block driver I/O systems require. In particular, block devices generally include hard disks, flash memory, and other hardware devices that randomly access data in blocks or chunks having a fixed size (e.g., hard drives have the capability to read the contents in a first arbitrary block and then read the contents in a different block that need not be consecutive or otherwise contiguous with the first block). However, managing I/O associated with block devices tends to be more difficult than managing I/O associated with hardware devices that access sequential data streams (e.g., serial ports and keyboards) because block devices have to navigate between different non-consecutive locations on the underlying media, and moreover, the performance demanded from block devices tends to be substantial because bottlenecks in the block I/O subsystem can lead to disk latencies, kernel bottlenecks, slower processor speeds, and other performance problems. Accordingly, to address problems in the block layer associated with the Linux kernel, the BIO structure was adopted to support adaptable abstractions that can handle common block device I/O functions, utilize capabilities associated with underlying block devices and drivers, and meet the requirements associated with callers or other components that write to and read from the block devices.

Figure 1:
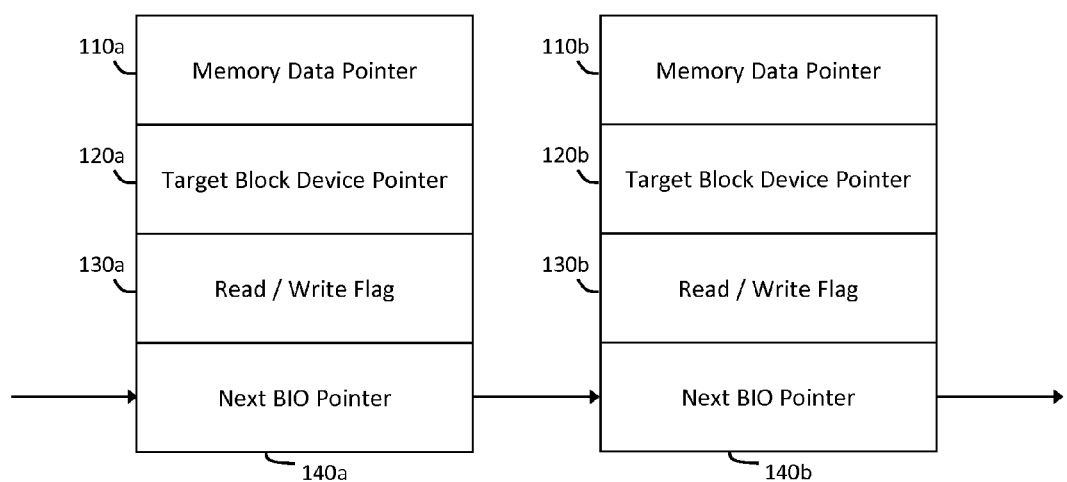
FIG. 1 illustrates contents in a block device I/O structure associated with a Linux kernel, according to an implementation.

In particular, the BIO structure in the redesigned Linux kernel generally encapsulates the I/O data structures and device-specific access routines to write to and read from block devices, wherein the BIO structure provides the basic block I/O container in the redesigned Linux kernel to represent in-flight (i.e., active) block I/O operations, whether caused via flushing a system page cache, directly opening or otherwise accessing a file (e.g., via an O_DIRECT flag), or other suitable operations to write to or read from block devices. FIG. 1 illustrates contents that a BIO structure array 100 may include to divide and manage block device I/O operations and thereby provide the Linux kernel with the capability to perform the block device I/O operations. For example, the BIO structure array 100 shown in FIG. 1 may include a first BIO data structure having a memory data pointer 110*a* that points to data stored in memory that will be dumped into a target block device, a target block device pointer 120*a* that points to a location in the target block device, a read/write flag 130*a* that indicates whether the current block device I/O operation relates to a read or write request, and a pointer 140*a* to a next BIO data structure that similarly includes a memory data pointer 110*b*, target block device pointer 120*b*, read/write flag 130*b*, and next BIO structure pointer 140*b* associated with a subsequent block device I/O operation. However, the BIO structure array 100 does not represent the final data abstraction and encapsulation used to perform the block device I/O operations.

Figure 2:
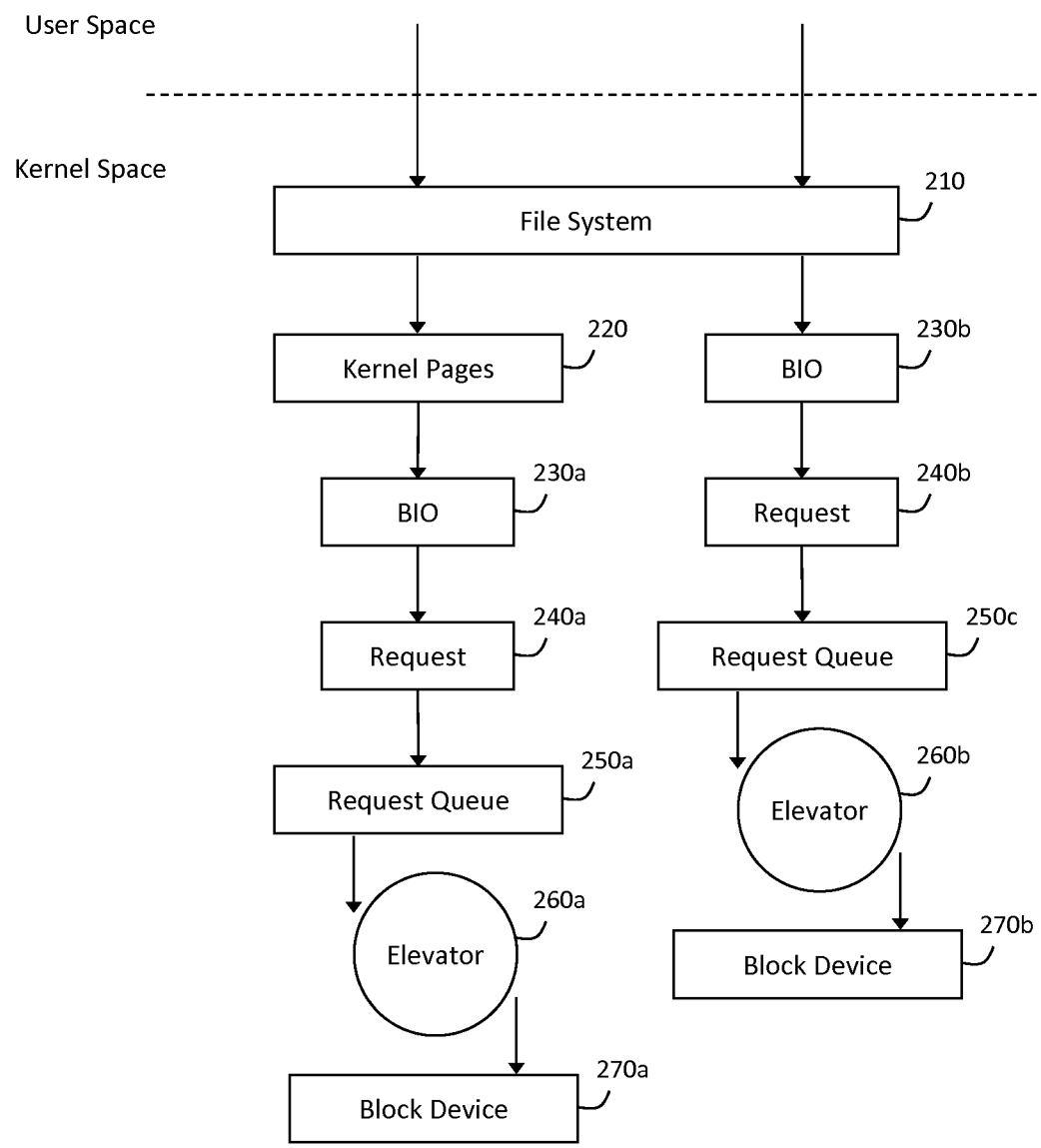
FIG. 2 illustrates a block device I/O subsystem associated with a Linux architecture, according to an implementation.

Rather, as shown in FIG. 2, the Linux architecture generally includes a block device I/O subsystem 200 having a user space that issues block device I/O operations to a kernel space, which includes a file system 210 that uses one or more BIO structures 230 to generate one or more "request" structures 240 representing individual block device I/O requests, which may optionally reference one or more pages 220 or other memory units associated with the Linux kernel, wherein the kernel space may then insert the request structures 240 into a "request queue" 250 that stores pending I/O requests associated with the target block device 270. Furthermore, the Linux kernel may include one or more "Elevators" 260 that continuously check the request queues 250 to determine whether any unhandled block device I/O operations waiting in the request queues 250. As such, if the request queues 250 are non-empty, the Elevators 260 may choose one request 240 from the request queue 250 according to one or more standard techniques and submit the chosen request 240 to the target block device 270. At that point, the block device I/O operation associated with the chosen request 240 has been completed and the BIO structure 230 associated with the completed block device I/O operation may then be released (e.g., freeing memory allocated thereto within the kernel pages 230). Accordingly, the request structures 240 and associated request queues 250 generally provide an intermediary layer between the BIO structure 230 and the Elevators 260, wherein the former contains data associated with block device I/O operations and the latter provides a mechanism to write and read all the data associated with block device I/O operations to and from the target block device 270. Additional detail relating to the BIO structure adopted in the recent versions associated with the Linux kernel and the block layer (or block I/O layer) redesign associated therewith may be provided in "Notes on the Generic Block Layer Rewrite in Linux 2.5" and "Linux Kernel Development Second Edition: Chapter 13. The Block I/O Layer," the contents of which are hereby incorporated by reference in their entirety.

Figure 3:
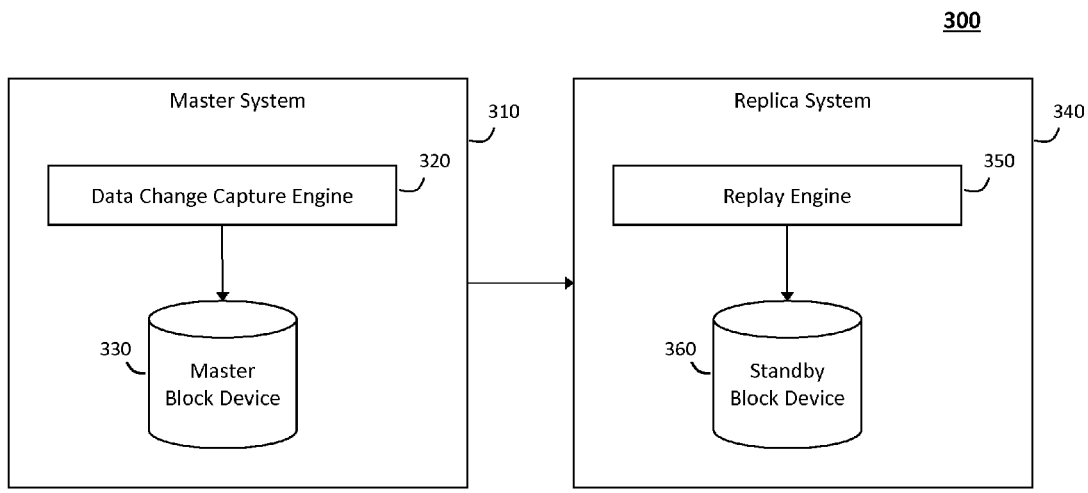
FIG. 3 illustrates a data replication system that can provide continuous data protection, according to an implementation.

However, despite the advantages that the BIO structure provides vis-à-vis the block I/O layer associated with the Linux kernel in earlier versions, the Linux kernel still lacks a native mechanism to suitably replicate or otherwise synchronize block device I/O operations, which tends to be an important consideration in systems that require continuous data protection. For example, FIG. 3 illustrates a data replication system 300 that can provide continuous data protection, which usually entails various synchronization and replication operations. In particular, the data replication system 300 may include a master system 310 that hosts a master block device 330 and a replica system 340 that hosts a standby (or replica) block device 360, wherein the various synchronization operations may generally copy all critical data stored on the master block device 330 to the standby block device 360 (e.g., creating every file located in a critical directory on the master block device 330 on the standby block device 360 according to a directory hierarchy associated with the master block device 330). Consequently, the synchronization operations may generally ensure that the master block device 330 and the standby block device 360 have an initially identical state and thereby create a base copy associated with the master block device 330 on the replica system 340. Furthermore, the replication operations may generally follow the synchronization operations, whereby a data change capture engine 320 on the master system 310 may capture and send all changes to the data on the master block device 330 to a replay engine 350 on the replica system 340. As such, the replay engine 350 may then replicate the captured changes to the master block device 330 on the standby block device 360, thereby ensuring that the master block device 330 and the standby block device 360 simultaneously evolve in exactly the same manner. Compared to the synchronization operations, which simply involve copying data from one location to another, the replication operations relate to how the data changes over time and therefore tend to have more importance in systems that require continuous data protection.

According to an implementation, the system and method described herein is directed to multiple-layer data replication in a Linux architecture and to leveraging a block input/output ("BIO") structure that the Linux kernel uses to provide an intermediate mechanism between file systems and block devices, capturing events that relate to the Linux kernel encapsulating changes to a master block device within the BIO structure, and replicating the changes encapsulated within the BIO structure on a standby (or replica) block device, thereby ensuring that the master block device and the standby block device have an identical state.

According to an implementation, the system and method described herein may generally provide various techniques to perform multiple-layer data replication in a Linux architecture, and more particularly, may utilize a block input/output ("BIO") structure in the input/output ("I/O") subsystem associated with the Linux kernel to perform data replication associated with I/O requests that are processed via a block device layer in the I/O subsystem associated with the Linux kernel. As such, in one implementation, the BIO structure may generally provide an intermediate or middle layer between a file system and a block device, whereby the system and method described herein may provide multiple-layer data replication at a whole block device level, a partition level, and a file system level (e.g., at the file level, folder level, directory level, etc.). For example, in one implementation, the system and method described herein may include various mechanisms that can capture events that relate to a Linux kernel converting one or more BIO structures into a block device I/O request, wherein the one or more BIO structures may encapsulate information relating to one or more changes that the block device I/O request will apply to data stored on a master block device. Accordingly, in one implementation, the one or more changes may then be replicated on a standby (or replica) block device to ensure that the master block device and the standby block device have a synchronized or otherwise identical state in a manner that may exhibit various advantages over techniques traditionally used to perform data replication in Linux architectures.

For example, the techniques traditionally used to perform data replication in Linux architectures tend to focus mainly on mounting a file system filter on a target folder to be replicated in order to capture changes to the target folder. In particular, the system and method described herein need not perform the file injection that traditional techniques require subsequent to mounting the file system filter on the target folder and may therefore achieve substantial performance savings over the traditional techniques. For example, file injection requires substituting any files already opened (after the file system filter has been mounted on the target folder) with newly opened files under the monitoring mechanism associated with the file system filter in order to capture changes to the already opened files. Furthermore, in contrast to traditional techniques that use file system filters, the system and method described herein may perform multiple-layer data replication without being concerned about cumbersome I/O operations on particular files, directories, or index-nodes, more commonly referred to simply as "inodes." Instead, as noted above, the system and method described herein may generally focus on BIO structures that encapsulate changes to be replicate, which can save substantial development and maintenance costs because the BIO structure does not encapsulate any changes if the underlying I/O request relates to a read request. Further still, mounting a file system filter on specialized Linux folders (e.g., "/etc" or "/usr/bin") tends to cause instability issues or system crashes, whereas the system and method described herein may impose monitoring to capture and replicate changes below the original file system (rather than above or on the file system) and thereby avoid the above-mentioned instability issues and system crashes.

More particularly, referring back to FIG. 3, the monitoring mechanism used to perform the multiple-layer data replication may be provided within the data change capture engine 320 associated with the master system 310, wherein the monitoring mechanism may intercept one or more events that relate to the Linux kernel using a BIO structure to create a request structure that will apply one or more changes to the master block device 330. As such, the monitoring mechanism may then analyze the BIO structure to identify information encapsulated therein that describes the changes that the created request structure will apply to the master block device 330.

Figure 4:
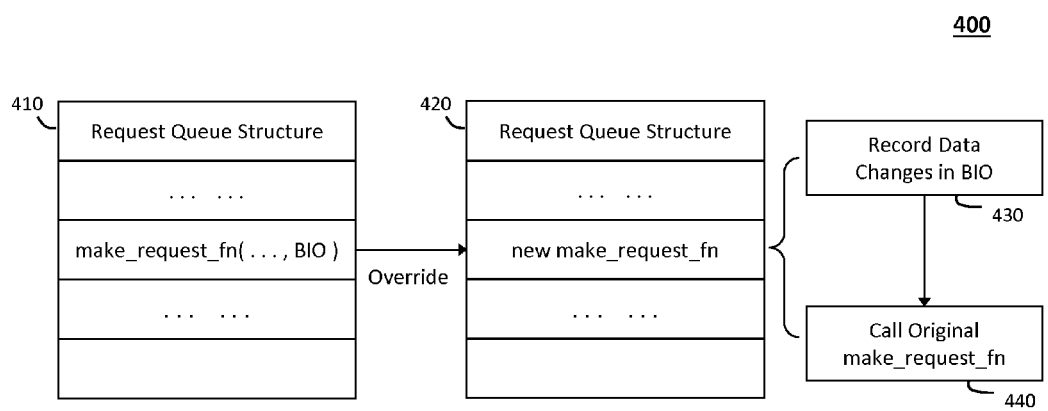
FIG. 4 illustrates a request queue structure overridden to support data replication in a multiple-layer Linux architecture, according to an implementation.
Figure 5A:
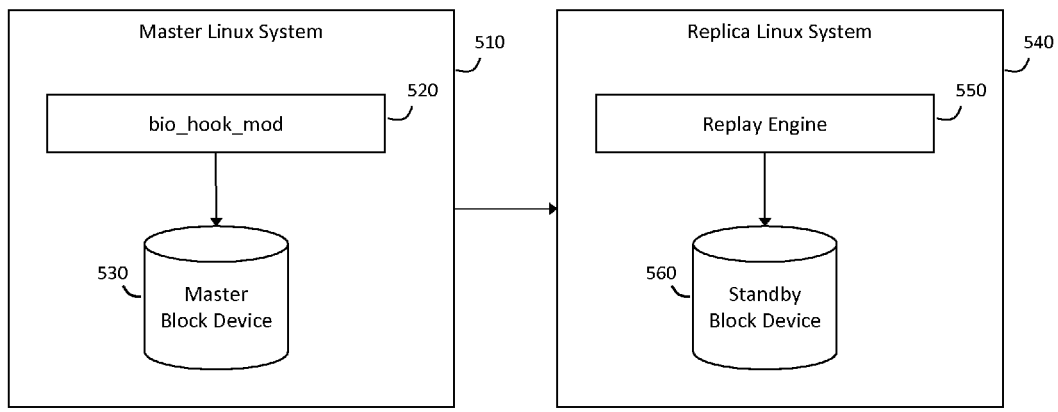

In one implementation, referring now to FIG. 5A, the monitoring mechanism noted above may include an independent Linux kernel module 520, which may be called "bio_hook_mod" or another suitable name, which may be configured to perform various steps in response to being loaded on a master Linux system 510. In particular, the Linux kernel module 520 (hereinafter "bio_hook_mod module") may initially locate a "gendisk" structure declared in "linux/genhd.h," which the Linux kernel uses to represent individual block devices, including the master block device 530. Further, as will be described in further detail below in connection with FIG. 5B, the Linux kernel may further use the gendisk structure to represent block device partitions. In one implementation, referring now to FIG. 4, the located gendisk structure may include a pointer to a request queue structure 410 having a pointer to the function "make_request_fn," which the Linux kernel may call to create a particular request structure from a particular BIO structure. In particular, the block layer associated with the Linux kernel may pass the request structure created from the BIO structure down to lower level drivers, wherein the block layer make_request_fn function builds the request structure and then places the request structure on the request queue 410.

Accordingly, whenever the bio_hook_mod module 520 detects one or more changes to the master block device 530 located on the master Linux system 510 to be replicated to a standby block device 560 located on a replica Linux system 540, the bio_hook_mod module 520 may locate the gendisk structure corresponding to the master block device 530. Furthermore, in certain scenarios, the master Linux system 510 may include multiple master block devices 530, in which case multiple corresponding gendisk structure may exist simultaneously. As such, locating the correct gendisk structure may be considered a prerequisite to performing any operations to replicate the changes to the master block device 530 on the standby block device 560, which may be achieved via one or more interfaces associated with the Linux kernel. For example, in one implementation, the bio_hook_mod module 520 may simply call the function "get_gendisk( )" with one or more appropriate parameters to locate the gendisk structure corresponding to the master block device 530 associated with the detected changes to be replicated on the standby block device 560. In one implementation, in response to having located the appropriate gendisk structure corresponding to the master block device 530 associated with the changes to be replicated on the standby block device 560, the bio_hook_mod module 520 may then read the located gendisk structure to obtain a "queue" pointer contained therein, which identifies the request queue structure 410 associated with the gendisk structure corresponding to the master block device 530.

In one implementation, a predefined function with the same type associated with the make_request_fn function may then be used to override the original make_request_fn function within the request queue 410 and thereby create an override request queue structure 420 that substitutes the original make_request_fn function with the predefined function, which may be called "new make_request_fn." In one implementation, the new make_request_fn function used in the override request queue 420 may have one or more parameters to specify a BIO structure, which may be used to perform an operation 430 to record all data changes that the BIO structure specified in the one or more parameters may encapsulate to describe one or more write requests associated with the master block device 530. As such, the data changes recorded in operation 430 may then be used to replicate the changes on the standby block device 560, as will be described in further detail below. Furthermore, in one implementation, the new make_request_fn function in the override request queue 420 may perform an additional operation 440 that uses the same parameters provided to the new make_request_fn function to call the original make_request_fn function in the original request queue structure 410 (i.e., prior to the override). For example, in one implementation, to override the original request queue structure 410, the pointer to the original make_request_fn function may be saved to a global variable associated with the bio_hook_mod module 520, whereby operation 440 may call the original make_request_fn function to apply the changes that were recorded in operation 430 to the master block device 530. Accordingly, the bio_hook_mod module 520 may be used to achieve multiple-layer data replication in a Linux architecture at various levels, which may include replication at a whole block device level, a partition level, and a file system level (e.g., at the file level, folder level, directory level, etc.).

More particularly, FIG. 5A generally illustrates a system 500A that may use the bio_hook_mod module 520 to achieve multiple-layer data replication at the whole block device level, which may be considered the most straightforward because the bio_hook_mod module 520 generally capture the BIO structures that relate to all I/O requests associated with a chosen master block device 530. As such, to replicate any changes to the master block device 530, the bio_hook_mod module 520 may simply send all captured changes to the master block device 530 to the replica Linux system 540, which may include a replay engine 550 that recreates or replays the I/O requests associated with the changes on the standby block device 560.

Figure 5B:
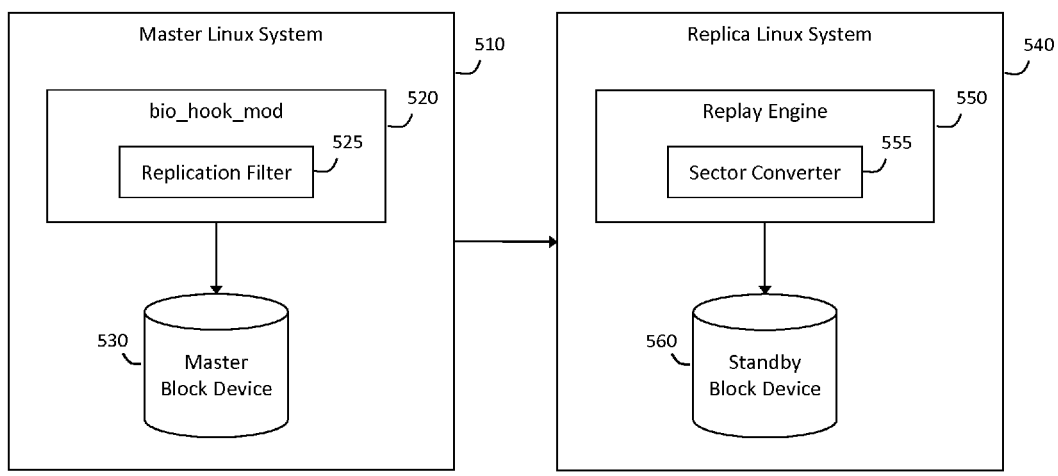
FIG. 5B illustrates a system to replicate one or more partitions in the master block device on the standby block device, according to an implementation.

With respect to replication at the partition level, wherein several different partitions may each occupy certain data spaces or data ranges within the master block device 530, the system 500B illustrated in FIG. 5B may be used to only replicate changes associated with selected partitions on the master block device 530 rather than the entire master block device 530 (e.g., to minimize the time, data quantity, or other aspects associated with the replication operations). As such, to achieve replication at the partition level, the bio_hook_mod module 520 may include a replication filter 525 that can record the sector address range that a particular partition to be replicated has on the master block device 530 and filter out any BIO structures that include changes to data located outside the particular partition from the changes to be replicated on the standby block device 560. For example, every partition in the Linux kernel may have a representative "partition" structure, wherein every instance associated with the partition structure may record a starting sector address and starting cylinder. In one implementation, in response to the bio_hook_mod module 520 capturing one or more BIO structures, the replication filter 525 may therefore compare the previously recorded sector address range with the sector addresses associated with the captured BIO structures to determine whether or not the captured BIO structures belong to the partition to be replicated.

In particular, if the sector addresses associated with the captured BIO structures apply to sectors outside the previously recorded sector address range associated with the partition to be replicated, the replication filter 525 may determine that the captured BIO structures need not be replicated and therefore discard the changes (although the original make_request_fn function may still be called to apply the changes to the master block device 530). In contrast, if the sector addresses associated with the changes encapsulated in the captured BIO structures will be applied to sectors between the starting and ending sector addresses associated with the partition to be replicated (i.e., the sector addresses fall within the previously recorded sector address range), then the bio_hook_mod module 520 may send the changes encapsulated in the captured BIO structures to the replica Linux system 540 to replicate the changes on the standby block device 560. Further, in one implementation, an address conversion may be performed on the replica Linux system 540 prior to replicating any appropriate changes on the standby block device 560 because the replication may occurs between different partitions on the master block device 530 and the standby block device 560. For example, although the partitions on the master block device 530 and the standby block device 560 supposedly have the same size and contain the same data, the respective partitions may nonetheless have different sector offsets on the master block device 530 and standby block device 560. Accordingly, in one implementation, the replay engine 550 may use a sector converter 555 to provide replication at the partition level, wherein the sector converter 555 may adjust the starting sector and cylinder offset associated with every change to be replicated in order to accommodate the particular configuration that the partition has on the standby block device 560.

In one implementation, in addition to replication at the partition level, the system 500B shown in FIG. 5B may further support replication at the file system level. For example, under certain conditions, replication at the whole block device and partition levels may be unsuitable because the whole master block device 530 and individual partitions associated therewith may contain more data that needs to be replicated, or alternatively because replication may only be desired to protect certain critical folders or files associated with the master block device 530. As such, to achieve replication at the file system level, the replication filter 525 may be further configured to perform a comparison that can filter changes to be replicated based on inodes (whereas the replication filter 525 may perform the comparison based on sectors to replicate at the partition level). For example, as will be described in further detail below, an inode generally represents a data structure that the Linux kernel uses to store information about files, directories, or other objects associated with a file system. More particularly, in one implementation, any particular BIO structure may generally include one or more pointers to identify one or more memory pages that initially store changes to data on the master block device 530 (e.g., as described in further detail above in connection with FIG. 1). Furthermore, the Linux kernel may represent the memory pages identified in the BIO structures using a "page" structure, which includes a pointer to a "mapping" structure that identifies an address space associated with the memory pages that store the changes to the data on the master block device 530, while the mapping structure may include a member "host" structure having a pointer to particular inodes associated with certain files, folders, or other file system objects associated with the data changes encapsulated in the BIO structure. Accordingly, in one implementation, the replication filter 525 may use the above-mentioned structures and associated pointers to trace every file, directory, or other file system object associated with any captured BIO structures because the Linux kernel generally associates every file, directory, or other file system object with an inode data structure.

For example, in one implementation the replication filter 525 may generally use the pointers in one or more captured BIO structures that encapsulate changes to the data on the master block device 530 to determine the memory pages that initially store the data changes, the page and mapping structures to determine the address space associated with the memory pages that store the data changes, and the host structure to determine the particular inodes associated with the files, folders, or other file system objects that relate to the data changes. Consequently, the replication filter 525 on the master Linux system 510 may compare the inodes associated with the data changes encapsulated in the current captured BIO structures to the inodes associated with certain files, directories, or other file system objects to be replicated on the standby block device 560 and thereby determine whether or not to replicate the changes encapsulated in the current captured BIO structures on the replica Linux system 540. For example, the replication filter 525 may record the inode associated with a certain critical folder or directory and only replicate changes that relate to files under that critical folder or directory while filtering out any changes that relate to files located in other folders or directories. Furthermore, in one implementation, the replication filter 525 may be configured to minimize the time associated with the comparison. For example, in one implementation, the bio_hook_mod module 520 may be configured to initially traverse particular folders or directories to be replicated on the replica Linux system 540 in an iterative manner to build a list that identifies the inode numbers associated with the particular folders or directories and every file or other file system object located under the particular folders or directories.

As such, in response to the bio_hook_mod module 520 subsequently capturing a particular BIO structure that encapsulates changes to the data on the master block device 530, the replication filter 525 may obtain the inode number associated with one or more inodes that relate to the changes encapsulated in the captured BIO structure and search the list against the inode numbers obtained from the captured BIO structure. In particular, the replication filter 525 may determine whether or not the inode numbers obtained from the captured BIO structure relate to the particular folders or directories to be replicated either directly or indirectly because the list may identify the inode numbers associated with the particular folders or directories in addition to every file or other file system object located therein. In response to determining that the inode numbers obtained from the captured BIO structure do not directly or indirectly match any inode numbers associated with the particular folders or directories to be replicated, the replication filter 525 may determine that the captured BIO structure need not be replicated and therefore discard the changes encapsulated therein (although the original make_request_fn function may still be called to apply the changes to the master block device 530 in the same manner as described above with respect to replication at the partition level). In contrast, if the inode numbers obtained from the captured BIO structure directly or indirectly match one or more inode numbers associated with the particular folders or directories to be replicated, the replication filter 525 may cause the bio_hook_mod module 520 to send the changes encapsulated in the captured BIO structure to the replica Linux system 540, which may invoke the replay engine 550 to replicate the changes on the standby block device 560.

Figure 6:
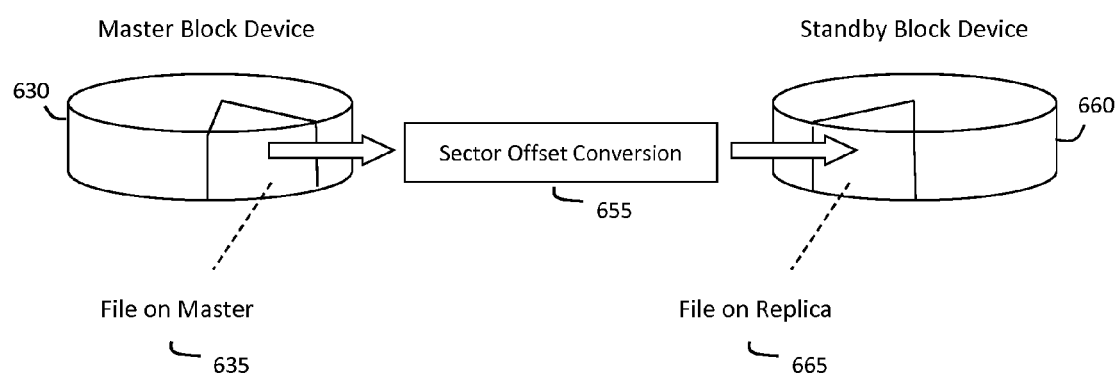
FIG. 6 illustrates an address mapping mechanism to convert sector addresses associated with files stored on a master block device to sector addresses that the files have on a standby block device, according to an implementation.

Furthermore, to replicate at the file system level, the replay engine 550 may use the sector converter 555 to perform an address conversion prior to replicating the changes on the standby block device 560 in order to accommodate the particular associated with the standby block device 560. For example, referring to FIG. 6, a sector offset conversion 655 may be performed to convert sector addresses that the data associated with the changes have on the master block device 630 to sector addresses that the corresponding data have on the replica block device 660. In particular, as described in further detail above in connection with FIG. 1, any particular BIO structure includes a pointer to the memory pages that store changes to data on the master block device 630 and a pointer to a target location on the master block device 630 where the data changes will be applied. As such, to replay the process used to apply the data changes on the master block device 630 (i.e., using the pointers to the memory pages and target location associated the master block device 630), the sector offset conversion 655 may adjust sector addresses associated with the master block device 630 to accommodate a mapping to sector addresses associated with the standby block device 660. For example, as shown in FIG. 6, a particular file 635 may have a particular sector address on the master block device 640 and the corresponding file 665 may have a different sector address on the standby block device 660, whereby the sector offset conversion 655 may convert the sector address that the file 635 has on the master block device 640 to the sector address that the file 665 has on the standby block device 660 to achieve replication at the file system level.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A system for multiple-layer data replication, the system comprising:
    a hardware master system; and
    a replication module hosted on the hardware master system, wherein the replication module is configured to:
    capture a block input/output structure created with an operating system kernel, wherein the block input/output structure encapsulates a change to be applied to data stored on a block device hosted on the master system, and the block input/output structure is used to determine a call to a standard function associated with the kernel to apply the change encapsulated in the block input/output structure to the data stored on the block device,
    call the standard function associated with the kernel to apply the change encapsulated in the block input/output structure to the data stored on the block device, and
    send the captured change encapsulated in the block input/output structure to a replica system based on a replication context associated with the data stored on the block device.

2. The system recited in claim 1, wherein the replication module is further configured to:
    locate a gendisk structure that the kernel uses to identify the block device associated with the change encapsulated in the block input/output structure,
    obtain a pointer contained in the gendisk structure that identifies a request queue, wherein the request queue includes a request structure that will apply the change encapsulated in the block input/output structure to the data stored on the block device, and
    record the change encapsulated in the block input/output structure from the request structure in the request queue.

3. The system recited in claim 1, wherein the replication module includes a replication filter configured to:
    record a sector address range associated with a partition on the block device subject to replication if the replication context comprises a partition level, and
    cause the replication module to send the change encapsulated in the block input/output structure to the replica system if the sector address range encompasses a sector address associated with the change encapsulated in the block input/output structure.

4. The system recited in claim 3, wherein the replication filter is further configured to discard the change encapsulated in the block input/output structure if the sector address range does not encompass the sector address associated with the change encapsulated in the block input/output structure.

5. The system recited in claim 3, further comprising a replay engine hosted on the replica system, wherein the replay engine is configured to:
    receive the change encapsulated in the block input/output structure from the replication module if the sector address range encompasses the sector address associated with the change encapsulated in the block input/output structure,
    adjust the sector address associated with the change encapsulated in the block input/output structure based on a sector address that data associated with the change encapsulated in the block input/output structure has on a standby block device of the replica system, and
    replay the change encapsulated in the block input/output structure on a partition associated with the standby block device based on the adjusted sector address to synchronize the partition subject to replication on the block device.

6. The system recited in claim 1, further comprising a replay engine hosted on the replica system, wherein the replay engine is configured to:
    receive the change encapsulated in the block input/output structure from the replication module if the replication context comprises a whole block device level, and
    replay the change encapsulated in the block input/output structure on a standby block device of the replica system to synchronize the standby block device with the block device.

7. The system recited in claim 1, wherein the replication module includes a replication filter configured to:
    determine an inode associated with a file system object on the block device subject to replication if the replication context comprises replication at a file system level,
    obtain an inode that corresponds to a file system object on the block device that is associated with the change encapsulated in the block input/output structure, and
    cause the replication module to send the change encapsulated in the block input/output structure to the replica system if the inode associated with the file system object subject to replication includes the inode that corresponds to the file system object that is associated with the change encapsulated in the block input/output structure.

8. The system recited in claim 7, wherein the replication filter is further configured to discard the change encapsulated in the block input/output structure if the inode associated with the file system object subject to replication does not include the inode that corresponds to the file system object that is associated with the change encapsulated in the block input/output structure.

9. The system recited in claim 7, further comprising a replay engine hosted on the replica system, wherein the replay engine is configured to:
    receive the change encapsulated in the block input/output structure from the replication module if the inode associated with the file system object subject to replication includes the inode that corresponds to the file system object that is associated with the change encapsulated in the block input/output structure, adjust a sector address associated with the file system object that is associated with the change encapsulated in the block input/output structure based on a sector address that data associated with the change encapsulated in the block input/output structure has on a standby block device of the replica system, and replay the change encapsulated in the block input/output structure on the standby block device based on the adjusted sector address to synchronize the file system object subject to replication on the block device.

10. The system recited in claim 7, wherein the replication filter is further configured to:

traverse the file system object subject to replication on the block device to obtain an inode number corresponding to the inode associated with the file system object subject to replication, store the inode number corresponding to the inode associated with the file system object subject to replication in a list, and search the list against an inode number associated with the inode that corresponds to the file system object associated with the change encapsulated in the block input/output structure to determine whether the inode associated with the file system object subject to replication includes the inode that corresponds to the file system object associated with the change encapsulated in the block input/output structure.

11. A method for multiple-layer data replication, the method comprising:

capturing a block input/output structure created with an operating system kernel at a replication module hosted on a master system, wherein the block input/output structure encapsulates a change to be applied to data stored on a block device hosted on the master system, and the block input/output structure is used to determine a call to a standard function associated with the kernel to apply the change encapsulated in the block input/output structure to the data stored on the block device;

calling, by the replication module, the standard function associated with the kernel to apply the change encapsulated in the block input/output structure to the data stored on the block device; and sending the captured change encapsulated in the block input/output structure from the replication module to a replica system that hosts a standby block device based on a replication context associated with the data stored on the block device.

12. The method recited in claim 11, further comprising:

locating, by the replication module, a gendisk structure that the kernel uses to identify the block device associated with the change encapsulated in the block input/output structure;

obtaining, by the replication module, a pointer contained in the gendisk structure that identifies a request queue, wherein the request queue includes a request structure that will apply the change encapsulated in the block input/output structure to the data stored on the block device; and recording, by the replication module, the change encapsulated in the block input/output structure from the request structure in the request queue.

13. The method recited in claim 11, further comprising recording a sector address range associated with a partition on the block device subject to replication if the replication context comprises a partition level and sending the change encapsulated in the block input/output structure to the replica system if the sector address range encompasses a sector address associated with the change encapsulated in the block input/output structure.

14. The method recited in claim 13, further comprising discarding, by the replication module, the change encapsulated in the block input/output structure if the sector address range does not encompass the sector address associated with the change encapsulated in the block input/output structure.

15. The method recited in claim 13, further comprising:

receiving the change encapsulated in the block input/output structure at a replay engine hosted on the replica system if the sector address range encompasses the sector address associated with the change encapsulated in the block input/output structure;

adjusting the sector address associated with the change encapsulated in the block input/output structure at the replay engine based on a sector address that data associated with the change encapsulated in the block input/output structure has on the standby block device; and replaying the change encapsulated in the block input/output structure at the replay engine on a partition associated with the standby block device based on the adjusted sector address to synchronize the partition subject to replication on the block device.

16. The method recited in claim 11, further comprising:

receiving the change encapsulated in the block input/output structure at a replay engine hosted on the replica system if the replication context comprises a whole block device level; and replaying the change encapsulated in the block input/output structure on the standby block device to synchronize the standby block device with the block device.

17. The method recited in claim 11, further comprising:

determining, by the replication module, an inode associated with a file system object on the block device subject to replication if the replication context comprises replication at a file system level;

obtaining, by the replication module, an inode that corresponds to a file system object on the block device that is associated with the change encapsulated in the block input/output structure; and sending the change encapsulated in the block input/output structure to the replica system if the inode associated with the file system object subject to replication includes the inode that corresponds to the file system object that is associated with the change encapsulated in the block input/output structure.

18. The method recited in claim 17, further comprising discarding, by the replication module, the change encapsulated in the block input/output structure if the inode associated with the file system object subject to replication does not include the inode that corresponds to the file system object that is associated with the change encapsulated in the block input/output structure.

19. The method recited in claim 17, further comprising:

receiving the change encapsulated in the block input/output structure at a replay engine hosted on the replica system if the inode associated with the file system object subject to replication includes the inode that corresponds the file system object that is associated with the change encapsulated in the block input/output structure;

adjusting a sector address associated with the file system object that is associated with the change encapsulated in the block input/output structure based on a sector address that data associated with the change encapsulated in the block input/output structure has on the standby block device; and replaying the change encapsulated in the block input/output structure on the standby block device based on the adjusted sector address to synchronize the file system object subject to replication on the block device.

20. The method recited in claim 17, further comprising:

traversing, by the replication module, the file system object subject to replication on the block device to obtain an inode number corresponding to the inode associated with the file system object subject to replication;

storing the inode number corresponding to the inode associated with the file system object subject to replication in a list; and searching, by the replication module, the list against an inode number associated with the inode that corresponds to the file system object associated with the change encapsulated in the block input/output structure to determine whether the inode associated with the file system object subject to replication includes the inode that corresponds to the file system object associated with the change encapsulated in the block input/output structure.

21. A computer program product comprising:

a non-transitory computer readable storage medium comprising computer readable program code embodied therewith for multiple-layer data replication, the computer readable program code comprising:

computer readable program code configured to capture a block input/output structure created with an operating system kernel at a replication module hosted on a master system, wherein the block input/output structure encapsulates a change to be applied to data stored on a block device hosted on the master system, and the block input/output structure is used to determine a call to a standard function associated with the kernel to apply the change encapsulated in the block input/output structure to the data stored on the block device;

computer readable program code configured to call, by the replication module, the standard function associated with the kernel to apply the change encapsulated in the block input/output structure to the data stored on the block device; and computer readable program code configured to send the captured change encapsulated in the block input/output structure from the replication module to a replica system that hosts a standby block device based on a replication context associated with the data stored on the block device.

22. The computer program product recited in claim 21, further comprising:

computer readable program code configured to locate, by the replication module, a gendisk structure that the kernel uses to identify the block device associated with the change encapsulated in the block input/output structure;

computer readable program code configured to obtain, by the replication module, a pointer contained in the gendisk structure that identifies a request queue, wherein the request queue includes a request structure that will apply the change encapsulated in the block input/output structure to the data stored on the block device; and computer readable program code configured to record, by the replication module, the change encapsulated in the block input/output structure from the request structure in the request queue.

23. The computer program product recited in claim 21, further comprising computer readable program code configured to record a sector address range associated with a partition on the block device subject to replication if the replication context comprises a partition level and to send the change encapsulated in the block input/output structure to the replica system if the sector address range encompasses a sector address associated with the change encapsulated in the block input/output structure.

24. The computer program product recited in claim 23, further comprising computer readable program code configured to discard, by the replication module, the change encapsulated in the block input/output structure if the sector address range does not encompass the sector address associated with the change encapsulated in the block input/output structure.

25. The computer program product recited in claim 23, further comprising:

computer readable program code configured to receive the change encapsulated in the block input/output structure at a replay engine hosted on the replica system if the sector address range encompasses the sector address associated with the change encapsulated in the block input/output structure;

computer readable program code configured to adjust the sector address associated with the change encapsulated in the block input/output structure at the replay engine based on a sector address that data associated with the change encapsulated in the block input/output structure has on the standby block device; and computer readable program code configured to replay the change encapsulated in the block input/output structure at the replay engine on a partition associated with the standby block device based on the adjusted sector address to synchronize the partition subject to replication on the block device.

26. The computer program product recited in claim 21, further comprising:

computer readable program code configured to receive the change encapsulated in the block input/output structure at a replay engine hosted on the replica system if the replication context comprises a whole block device level; and computer readable program code configured to replay the change encapsulated in the block input/output structure on the standby block device to synchronize the standby block device with the block device.

27. The computer program product recited in claim 21, further comprising:

computer readable program code configured to determine, by the replication module, an inode associated with a file system object on the block device subject to replication if the replication context comprises replication at a file system level;

computer readable program code configured to obtain, by the replication module, an inode that corresponds to a file system object on the block device that is associated with the change encapsulated in the block input/output structure; and computer readable program code configured to send the change encapsulated in the block input/output structure to the replica system if the inode associated with the file system object subject to replication includes the inode that corresponds to the file system object that is associated with the change encapsulated in the block input/output structure.

28. The computer program product recited in claim 27, further comprising computer readable program code configured to discard, by the replication module, the change encapsulated in the block input/output structure if the inode associated with the file system object subject to replication does not include the inode that corresponds to the file system object that is associated with the change encapsulated in the block input/output structure.

29. The computer program product recited in claim 27, further comprising:
- computer readable program code configured to receive the change encapsulated in the block input/output structure at a replay engine hosted on the replica system if the inode associated with the file system object subject to replication includes the inode that corresponds the file system object that is associated with the change encapsulated in the block input/output structure;
- computer readable program code configured to adjust a sector address associated with the file system object that is associated with the change encapsulated in the block input/output structure based on a sector address that data associated with the change encapsulated in the block input/output structure has on the standby block device; and
- computer readable program code configured to replay the change encapsulated in the block input/output structure on the standby block device based on the adjusted sector address to synchronize the file system object subject to replication on the block device.

30. The computer program product recited in claim 27, further comprising:
- computer readable program code configured to traverse, by the replication module, the file system object subject to replication on the block device to obtain an inode number corresponding to the inode associated with the file system object subject to replication;
- computer readable program code configured to store the inode number corresponding to the inode associated with the file system object subject to replication in a list; and
- computer readable program code configured to search, by the replication module, the list against an inode number associated with the inode that corresponds to the file system object associated with the change encapsulated in the block input/output structure to determine whether the inode associated with the file system object subject to replication includes the inode that corresponds to the file system object associated with the change encapsulated in the block input/output structure.

\* \* \* \* \*